No. 692,108. Patented Jan. 28, 1902.
H. W. BLAISDELL.
APPARATUS FOR HANDLING TAILINGS.
(Application filed Oct. 23, 1900. Renewed Nov. 19, 1901.)
(No Model.) 2 Sheets—Sheet 1.
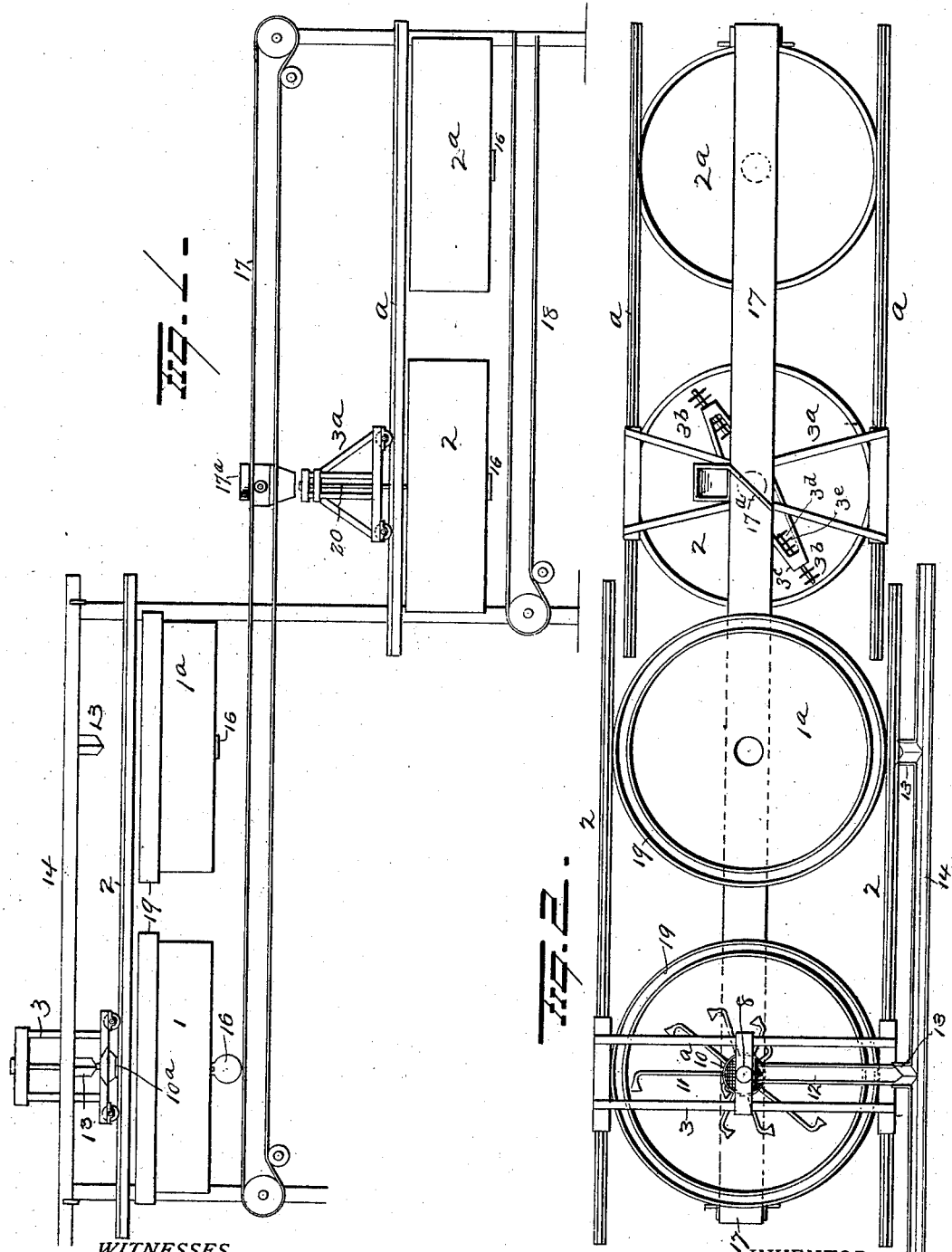
WITNESSES
INVENTOR
H. W. Blaisdell
By H. A. Seymour
Attorney No. 692,108. Patented Jan. 28, 1902.
H. W. BLAISDELL.
APPARATUS FOR HANDLING TAILINGS.
(Application filed Oct. 23, 1900. Renewed Nov. 19, 1901.)
(No Model.) 2 Sheets—Sheet 2.
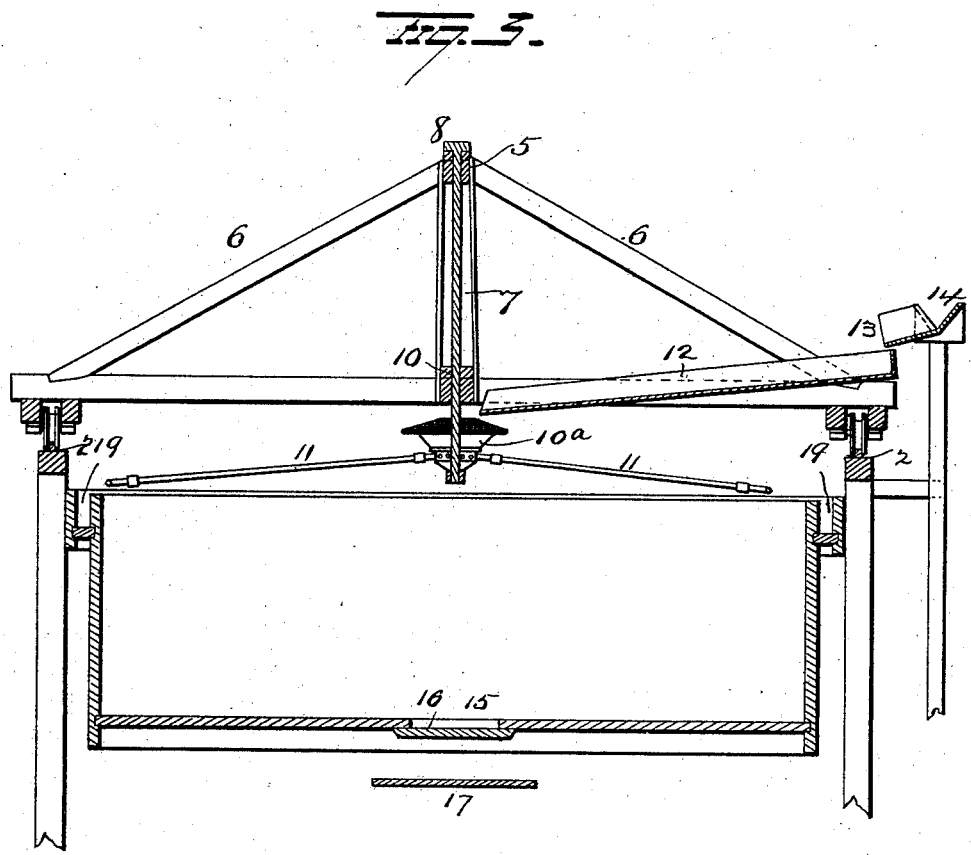
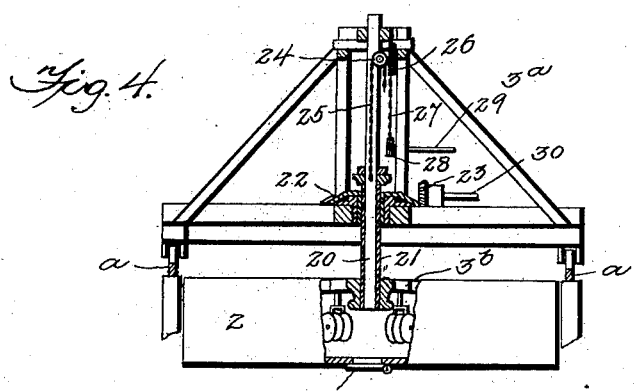
WITNESSES
E. J. Nottingham
G. F. Downing
INVENTOR
H. W. Blaisdell
By H. A. Seymour
Attorney

UNITED STATES PATENT OFFICE.

HIRAM W. BLAISDELL, OF YUMA, ARIZONA TERRITORY.

APPARATUS FOR HANDLING TAILINGS.

SPECIFICATION forming part of Letters Patent No. 692,108, dated January 28, 1902.

Application filed October 23, 1900. Renewed November 19, 1901. Serial No. 82,893. (No model.)

*To all whom it may concern:*

Be it known that I, HIRAM W. BLAISDELL, a resident of Yuma, in the county of Yuma and Territory of Arizona, have invented certain new and useful Improvements in Apparatus for Handling Tailings; and I do hereby declare the following to be a full, clear, and exact description of the invention, such as will enable others skilled in the art to which it appertains to make and use the same.

My invention relates to an improved apparatus for handling tailings, the object of the invention being to so mount a distributer on a traveling bridge that it can be moved from vat to vat to distribute tailings and the like in any one or all of an indefinite number of vats.

The aim of all improvements in the cyanid process at the present time is toward the working of the stamp-mill tailings direct as they are produced by the mill, thereby avoiding the expensive rehandling from a tailings-pond to the leaching-vats. This is done by running the tailings directly to the leaching-vats from the mill, they being distributed over the surface of the vat. The surplus water overflows until the vat is well filled with tailings, when the stream is diverted to another vat. This method causes the tailings to be deposited more or less in layers, which prevents thorough treatment and leaching by the cyanid solution, so the present plan is to give the tailings a preliminary treatment with the cyanid solution in the vat in which they are deposited and then shovel the tailings through holes in the bottom of the vat into a vat directly below or into cars which convey the tailings to another vat for final treatment, after which the waste tailings are shoveled through holes in the bottom of the vat into cars, which convey it to waste-dumps. Sometimes hydraulic pressure is used to sluice the tailings from the vats to the waste-dump. To avoid this handling of the tailings, which is extremely expensive and slow, I provide a traveling bridge adapted to be moved from vat to vat, and a distributer is mounted on the bridge to distribute the tailings in any one of the vats, as will now be described.

In the accompanying drawings, Figure 1 is a view illustrating my improvements. Fig. 2 is a plan view of the same; and Fig. 3 is a view in vertical section through one vat, with the bridge 3 mounted above it. Fig. 4 is a detail view showing means for raising and lowering the distributer $3^b$.

1 $1^a$ represent vats arranged in line and provided on each side with an elevated rail forming a track 2, on which is mounted a traveling bridge 3, which is adapted to move from one vat to another, and a distributer is carried by the bridge and adapted to be moved from one vat to another, so as to discharge tailings or other material evenly throughout the same.

2 $2^a$ represent vats in line with vats 1 $1^a$, but in a lower plane; and said vats 2 $2^a$ are provided on each side with a rail to form a track $a$ for a bridge $3^a$, carrying rotary distributers $3^b$, adapted to be rotated within the vats to distribute the material evenly throughout them and to draw the material to the central discharge-ports in said vats, said distributers comprising a revoluble frame or cross-head $3^c$, to which shafts $3^d$ are connected between their ends, and on each of said shafts a series of disks $3^e$ is mounted. By adjusting the shafts $3^d$ relatively to the path of rotation of the frame or cross-head $3^c$ the material in the vat will be distributed or leveled or moved to the central outlet of the vat, according to the angle at which the shafts $3^d$ are set, as explained more in detail in my pending application for patent, filed August 4, 1900, Serial No. 25,932. Any suitable means may be connected with the bridge and employed for raising the distributer from one vat and lowering it into another.

One of the various means which might be employed for raising and lowering the distributer $3^b$ and for rotating it is shown in Fig. 4. As here shown, the distributer $3^b$ is provided with a shaft 20, which passes freely through the framework of the bridge $3^a$ and has secured to it a sleeve 21, also adapted to be moved vertically, and said sleeve is provided with a gear 22, which receives motion from a pinion 23 for rotating the distributer. The pinion 23 is secured to a shaft 30, to which motion is imparted in any suitable manner. A sprocket-wheel 24 is mounted in the upper part of the bridge-frame, and over this wheel a sprocket-chain 25 passes, said chain being also secured to the shaft 20. Motion may be imparted to the wheel 24 through the medium of worm or other gearing from a sprocket-wheel 26. A sprocket-chain 27 passes over the wheel 26 and transmits motion thereto from a sprocket-wheel 28, the latter being secured to a shaft 29, to which motion may be imparted in any suitable manner.

The bridge 3 is provided centrally with a friction-bearing 5, supported by inclined bars 6, and a vertical shaft 7 is mounted in said bearing and provided at its upper end with an enlargement or head 8, supported on the friction-bearing 5, and said shaft is mounted near its lower end in a bearing 10, supported by the bridge directly below bearing 5 to prevent lateral movement of the shaft. To the lower end of shaft 7 a distributer is secured, which latter comprises a conical screened receptacle $10^a$, with which radial pipes 11 of varying lengths communicate, and each pipe is provided at its outer end with a rearwardly-projecting discharge-spout, so that the discharge of material therefrom will revolve the distributer, and hence the pipes will evenly distribute the tailings about the vat.

An inclined trough 12 is mounted on the bridge 3 and is adapted to receive the tailings from a spout 13 and convey them to the screened receptacle $10^a$, the spout 13 adapted to divert the tailings from a launder 14, disposed beside the vats and communicating directly with the stamp-mill, and said launder is provided at each vat with a spout which may be operated to deflect the tailings when desired.

All of the vats are preferably provided centrally in their bottoms with discharge-ports 15, normally closed by gates 16, and an endless conveyer 17 is located beneath vats 1 and $1^a$ and adapted to convey the material therefrom, said material being discharged from the conveyer 17, by means of a deflector $17^a$, to the rotary distributers $3^b$, carried by bridge $3^a$, and said rotary distributers $3^b$ will distribute the material throughout vats 2 $2^a$, and a conveyer 18 is disposed beneath the discharge-ports of vats 2 $2^a$ and adapted to convey the waste material to a dump.

Each vat 1 and $1^a$ is preferably provided with a trough or receptacle 19 surrounding it, so that the water from the tailings can overflow from the vat to permit the same to be entirely filled with the tailings.

The operation of my improvement is as follows: The tailings directly from the stamp-mill are discharged into launder 14 and carried to and deflected by the spout 13 onto trough 12 on bridge 3, which latter is disposed above vat 1, wherein the preliminary treatment of the tailings is to take place. The trough 12 will discharge the tailings into the distributer to evenly distribute the same in the vat, and when the latter is full the bridge 3 will be moved to vat $1^a$ and the same filled with tailings. After the tailings in vat 1 are given their preliminary treatment the gate 16 in the bottom thereof is opened and the tailings discharged through the central discharge-port onto conveyer 17 and carried to bridge-distributers $3^b$, as above described, and distributed by them about the vat 2 and there given their final treatment, when the distributers $3^b$ can be used to discharge the material from vat 2 through its discharge-port onto conveyer 18 and carried by the latter to the waste-dump. The material after being given its preliminary treatment in vat $1^a$ can be carried to vat $2^a$, as above explained, and discharged from vat $2^a$ and carried to the dump in the same manner as above described in connection with vat 2.

Various slight changes might be resorted to in the general form and arrangement of the several parts described without departing from the spirit and scope of my invention, and hence I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In an apparatus for treating tailings, the combination with a frame of a bridge movable thereon and a revoluble distributer mounted on said bridge and adapted to be carried thereby from one vat to another.

2. In an apparatus for treating tailings, the combination with a series of vats and a track adjacent to said vats, of a traveling bridge mounted on said track, a revoluble distributer carried by said bridge adapted to discharge material in any of said vats and means for supplying material to said distributer.

3. In an apparatus for treating tailings, the combination of two series of vats disposed in different planes, of a traveling bridge mounted to move above the lower series of vats and means on said bridge for distributing the material supplied to it from the upper vats, evenly throughout the lower vats.

4. In an apparatus for treating tailings, the combination with two series or sets of vats disposed in different planes, of traveling bridges located above each set or series of vats, a distributer for tailings carried by the upper bridge, a combined distributer and excavator for tailings carried by the lower bridge and means for carrying material from the upper series of vats to the lower.

5. In an apparatus for treating tailings, the combination with two sets or series of vats disposed in different planes, of traveling bridges located above each set or series of vats, means for distributing the material in the vats carried by each bridge, a conveyer adapted to carry the material from one series of vats to the other and a conveyer for conveying the material from the last-mentioned series of vats.

In testimony whereof I have signed this specification in the presence of two subscribing witnesses.

HIRAM W. BLAISDELL.

Witnesses:
SELIM M. FRANKLIN,
HORTENSE DALTON.